United States Patent [19]

Rempe et al.

[11] Patent Number: 5,344,668

[45] Date of Patent: Sep. 6, 1994

[54] APPLYING DISPERSIONS TO SELECTED FUEL CELL ELECTRODE PLATE REGIONS

[75] Inventors: Richard J. Rempe, West Hartford; Robert C. Stewart, Jr., West Suffield, both of Conn.

[73] Assignee: International Fuel Cells Corporation, South Windsor, Conn.

[21] Appl. No.: 813,470

[22] Filed: Dec. 26, 1991

[51] Int. Cl.$^5$ .................. B05D 5/12; B05C 11/00
[52] U.S. Cl. .................. 427/115; 427/284; 427/286; 427/424; 118/669; 118/676; 118/677
[58] Field of Search ............ 427/115, 424, 284, 286; 118/676, 677, 669, 314, 315, 683, 684

[56] References Cited

U.S. PATENT DOCUMENTS

| | | | |
|---|---|---|---|
| 4,279,673 | 7/1981 | White et al. | 427/284 |
| 4,695,482 | 9/1987 | Weiswurm | 118/676 |
| 4,849,253 | 7/1989 | Maricle et al. | 427/115 |

Primary Examiner—Shrive Beck
Assistant Examiner—David M. Maiorana

[57] ABSTRACT

A flowable substance is applied to at least one predetermined area of a major surface of a plate-shaped fuel cell component by directing at least one stream of the flowable substance toward a predetermined zone that is situated in a plane along which the major surface of the component extends, facing the stream. The size of the predetermined zone is smaller than that of the predetermined area, and relative movement along the plane is effected between the component and the predetermined zone in such a manner that at least the entire predetermined area of the major surface gradually advances through the predetermined zone in a predetermined advancement direction and path. The stream is controlled in such a manner that it is in existence only while the zone is completely within the predetermined area, and until the zone has coincided with all of the predetermined area.

1 Claim, 1 Drawing Sheet

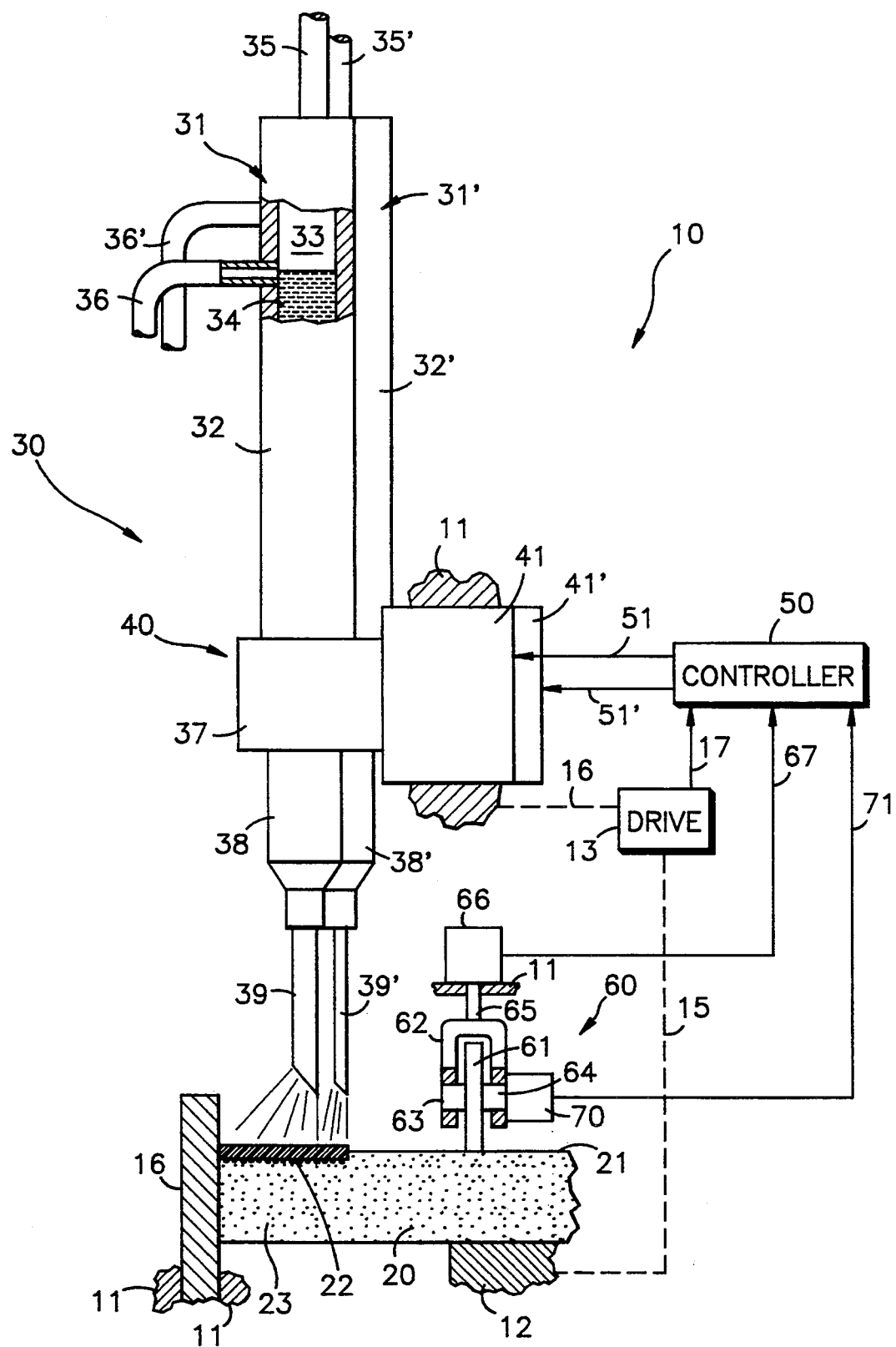

APPLYING DISPERSIONS TO SELECTED FUEL CELL ELECTRODE PLATE REGIONS

DESCRIPTION

1. Technical Field

The present invention relates to the application of flowable substances to substrates in general, and more particularly to applying dispersions to selected regions of fuel cell electrode plates.

2. Background Art

There are already known various constructions of fuel cells, among them such in which it is necessary or advantageous to treat selected regions of various fuel cell components with flowable substances. For example, it may be desired to wetproof such selected regions by applying thereto an initially flowable substance, such as a fluorocarbon dispersion, that solidifies after its application and thereafter confers the desired wetproof characteristic on such regions. The presence of such fluorocarbon or similar deposits on or in fuel cell electrodes is often necessary to create corrosion resistant areas within the cell.

The need for or desirability of providing such wetproofed or similarly treated regions has already been previously recognized, as has the need for giving such treated regions quite sharply defined outlines or contours. Particularly in order to satisfy the last-mentioned need, one method that is currently in widespread use for applying such wetproofing or similar compounds is the so-called screen printing process technique, which involves the application of the respective flowable substance, such as a dispersion or "ink", to the selected region or regions of a substrate through a screen while the remaining regions of the substrate are masked. By properly choosing the consistency or viscosity of the substance, the length of the time interval during which the screen/mask member is in contact with the substrate, the amount and distribution of the substance present on the screen/mask member at the beginning of such time interval, and the manner in which the substance is forced, such as by a squeegee or the like, through the screen, it is possible to control, within limits, not only the degree of conformity of the contour of the thus treated region to the desired one, but also, when the substrate is porous, the depth of penetration of the substance into the substrate at the affected region.

However, experience has shown that, while the screen printing process is ideally suited for applying thin coats of dispersions on the surfaces of smooth surfaced substrates, it in many instances leaves much to be desired when it is attempted to use it for applying coatings to rough or porous substrate. Moreover, this process is not capable of easily and reliably forcing a semi-liquid substance into the structure of a porous material, particularly when it is desired to cause the substance to permeate into more than just the area immediately underlying the surface to which the substance is applied and especially when the substance is to impregnate the selected region of the substrate throughout the thickness of the latter. Yet, such impregnation has been accomplished in the past with some degree of success by screen printing the part while it was held under partial vacuum that is applied in such a manner as to draw the substance deeper into the substrate. Nevertheless, even this process is less than satisfactory in many cases, especially because the constraints placed on the selection of the viscosity of the substance by use of the screen printing process, in combination with the vagaries of the vacuum drawing process, result in less than ideal impregnation of the affected region of the substrate by the substance and/or in less than accurate definition of the boundary of the affected region or conformity to its desired course. More particularly, given the nature of variations in substrate pore spectra and the vagaries of screen process printing, dimensional control of the fluorocarbon deposit is difficult to achieve. In addition, the necessity for a screen process fluorocarbon ink which will penetrate the porous substrate, particularly an electrode, and yet not run through the screen between printing cycles makes the process difficult to manage. Based on the above considerations, it has been determined that the screen printing process is not suited to high production subsurface wetproof application.

Accordingly, it is a general object of the present invention to avoid the disadvantages of the prior art.

More particularly, it is an object of the present invention to provide a method of impregnating selected regions of porous substrates, especially of fuel cell electrode plates, with flowable substances capable of subsequent solidification, which method does not possess the disadvantages of the known methods of this kind.

Still another object of the present invention is to develop the impregnating method of the type here under consideration in such a manner as to assure penetration of the substance into and substantially uniform distribution of such substance throughout the affected region of the porous substrate.

A further object of the present invention is to present a method of the above kind the performance of which will result in much better coincidence than before of the actual boundaries of the impregnated region with the desired ones.

It is yet another object of the present invention to devise an apparatus that is well suited for the performance of the method of the above type.

A concomitant object of the present invention is design the apparatus of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for applying a flowable substance to at least one predetermined area of a major surface of a plate-shaped fuel cell component. This arrangement includes means for supporting the component in such a manner that the major surface thereof extends along a predetermined plane and faces in a given direction, and means for directing at least one stream of the flowable substance substantially opposite to the given direction toward a predetermined zone that is situated in the aforementioned plane. There is further provided means for effecting relative movement between the component supported on the supporting means and the directing means in such a predetermined advancement direction and path along the above plane that at least all of the predetermined area of the major surface is gradually juxtaposed with the predetermined zone, and means for controlling the directing means in such a manner that the stream is in existence only while the predetermined zone is completely within the predetermined area, and until the zone has been juxtaposed with all of the predetermined area.

In accordance with another facet of the present invention, there is provided a method of applying a flowable substance to at least one predetermined area of a major surface of a plate-shaped fuel cell component, this method including the steps of supporting the component in such a manner that the major surface thereof extends along a plane and faces in a given direction, effecting such relative movement along the aforementioned plane between the component and a predetermined zone situated in the plane that at least the entire predetermined area of the major surface gradually advances through the predetermined zone in a predetermined advancement direction and path, and controlledly directing at least one stream of the flowable substance substantially opposite to the given direction toward the predetermined zone in such a manner that the stream is in existence only while the predetermined zone is completely within the predetermined area, and until the zone has coincided with all of the predetermined area.

BRIEF DESCRIPTION OF THE DRAWING

The present invention will be described in more detail below with reference to the sole FIGURE of the accompanying drawing, which is a somewhat simplified, partially sectioned, front elevational view of an apparatus constructed in accordance with the present invention for applying a dispersion to a selected region of a porous substrate.

BEST MODE FOR CARRYING OUT THE INVENTION

Referring now to the drawing in detail, and first to FIG. 1 thereof, it may be seen that the reference numeral 10 has been used therein to identify a machine or apparatus for applying a flowable substance to a plate-shaped substrate or another, similar, workpiece 20. More particularly, the apparatus 10 has been illustrated, and will be described herein, mainly as being used to perform an improved method according to the present invention for applying a fluorocarbon dispersion to specific surface and porous subsurface areas of the workpiece 20, particularly of a porous fuel cell electrode.

The apparatus 10 includes, as some of its main components, a main support 11, a workpiece support 12 to be used for supporting the workpiece or substrate 20 in such a manner that a major surface 21 of the substrate 20 faces in the upward direction, and an applicator device 30 that is mounted on the main support 11 in such a manner as to be immovable or stationary relative thereto. The workpiece support 12, on the other hand, is constructed in such a manner as to enable relative movement between the respective workpiece 20 supported on the workpiece support 12 and the applicator device 30 along a plane that includes the major surface 21 of the substrate 20, at least in an advancement direction that is substantially normal to the plane of the drawing. So, for instance, the workpiece support 12 may advantageously be constituted by a belt conveyor of any known construction which not only supports the workpiece 20 but also advances the same in the aforementioned advancement direction with respect to the main support 11 and thus relative to the applicator device 30. This relative advancement movement is diagrammatically indicated in the drawing by the presence of a drive 13, and of two connecting lines 14 and 15 which connect the drive 13 with the main support 11, on the one hand, and with the workpiece support 12, on the other hand, to represent the fact that the drive 13 is mechanically connected with the supports 11 and 12 and causes advancement of the workpiece 20 in the advancement direction with respect to the applicator device 30. A guide rail 16 is shown to be mounted on the main support 11 in such a position relative to the workpiece support 12 that the workpiece 20 supported on the latter is guided thereby and hence the transverse position of the workpiece 20 on the workpiece support 12 is determined with a high degree of precision, especially when a similar and complementary guide rail is arranged at the other side of the workpiece support 12.

The applicator device 30 is shown to include two applicator assemblies 31 and 31' that are similar to one another in so many respects, both as to their structure and their operation, that the same reference numerals, distinguished from one another merely by the presence or absence of a prime, have been used to identify them and their respective corresponding parts. Moreover, because of this similarity, only the applicator assembly 31 will be described here in some detail; however, and it is to be understood that, unless indicated otherwise, this description is equivalently applicable to the assembly 31'.

The applicator assembly 31 includes a receptacle 32 that bounds an internal chamber 33 that is partially filled with a body 34 of a flowable substance that is to be applied by the applicator assembly 31 to a selected region 22 of the porous substrate 20. The flowable substance body 34 is replenished by feeding additional amounts of the flowable substance into the chamber 33 via a supply conduit 35. For a reason that will be presented later, it is desirable for the upper surface of the flowable material body 34 to rise in the chamber 33 only to a predetermined level, and to remain substantially at this level for the entire time of operation of the applicator device 30. As can be perceived from the drawing, this is achieved in the applicator assembly 31 by providing an overflow conduit 36 that opens into the chamber 33 at the predetermined level and is operative for discharging as much of the flowable substance as would cause the upper surface to rise to a meaningful extent above the predetermined level.

The receptacle 32 is shown to be mounted on a housing 37 which is that of an on/off valve device 40 that is of a conventional construction and includes an internal passage that is closable by a valve member and, in the open position of the valve member, connects the chamber 33 with an interior of a tubular connecting element 38 which, in turn, communicates with an internal passage of a tubular applicator element 39 that is shown to have a configuration reminiscent of that of a hypodermic needle. The valve device 40 is of the type in which the aforementioned valve member is switched between its open and closed positions in response to external signals. It has been found to be advantageous to use a solenoid-operated valve device as the valve device 40. Then, the valve device 40 further includes a solenoid or actuator housing 41 that is shown in the drawing as being mounted on the main support 11 and carrying the valve housing 37 and accommodates a solenoid or a similar actuator that is connected, in a well known manner, with the valve member such as to displace it, in response to signals received from a controller 50 via an electrical connecting line 51, between its open and closed positions.

It will be appreciated that, when the valve member of the valve device 40 is in its open position, the flowable substance of the body 34 will flow though the internal passage of the valve housing 37, then through the interior of the connecting element 38 and that of the applicator element 39 to ultimately leave the latter and be sprayed onto or otherwise directed against the major surface 21 of the workpiece 20 and more particularly the zone of the major surface 21 that overlies the region 22 of the workpiece 20.

Now, as may be perceived from the drawing, the only significant structural difference between the applicator assemblies 31 and 31' is that the diameter of the tubular applicator element 39 (or, more importantly, that of the internal passage thereof) significantly exceeds the diameter of the tubular applicator element 39' (or that of its internal passage). As a result, when the valves 40 and 40' are in their open states, the volumetric rate of flow of the flowable substance to be applied to the region 22 through the applicator element 39 greatly exceeds that taking place through the applicator element 39', so that the applicator assembly 31 supplies a relatively huge amount of the flowable substance to the region 22 but with relatively low precision as far as the boundary definition is concerned, and can thus be called coarse directing means. On the other hand, the applicator assembly 31', while delivering only a minute proportion of the total amount of the flowable substance to the region 22, does it with high precision and hence can be referred to as fine directing means.

It may be seen in the drawing that the applicator element 39' is offset in a direction normal to the aforementioned advancement direction relative to the applicator element 39, so that it directs its relatively fine stream against a boundary zone of the region 22, thus precisely defining the boundary of the region 22, while the coarse stream issuing from the applicator element 39 delivers the bulk of the flowable substance to all but the border zone, thus not impairing the precision of the definition of the affected region 22. It may also be perceived from the drawing that the applicator assemblies 31 and 31', and thus the applicator elements 39 and 39' are also offset from one another in the advancement direction, so that the zones against which they direct their respective streams at any instant of time are not necessarily contiguous.

The apparatus 10 as described so far can be used for applying the flowable substance to the porous workpiece 20 when it is desired for the affected region 22 to extend over the entire length of a marginal portion 23 of the workpiece 20, that is, all the way from the leading edge to the trailing edge of the workpiece 20 as considered in the advancement direction. In this case, when it is desired to apply the flowable substance, which will be described below for convenience as containing fluorocarbon material without being limited thereto, such material is first suspended or dispersed in an aqueous or non-aqueous medium, then the suspension or dispersion is introduced into the chamber 33 of the receptacle 32 (and a corresponding chamber of the receptacle 32') to form the respective body, such as 34, therein, and finally the flowable substance is dispersed through the applicator elements 39 and 39'. The discharge of the fluorocarbon dispersion through each of the applicator elements 39 or 39' takes place at a substantially constant pressure. This is so because of the provision of the respective overflow tube 36 or 36' which prevents the upper surface of the respective flowable substance body, such as 34, to rise above the aforementioned predetermined level, coupled with the supply of the replenishment flowable substance through the respective supply pipe or conduit 35 or 35' at a rate that is sufficient for the upper surface of the respective flowable substance body, such as 34, not to drop more than to a negligible extent below the predetermined level. Because of the resulting maintenance of the respective flowable substance body upper surface at the predetermined level, the pressure head of such body, such as 34, remains substantially constant as well throughout the flowable substance dispensation process. The volumetric flow rate through the applicator elements 39 and 39' can be selected, though, either by changing the vertical location of the overflow tube 36 or 36', or by replacing the respective applicator element 39 or 39' by another one having an internal passage of a different cross-sectional area, or both. It will be appreciated that the volumetric flow rate and the speed at which the affected region 22 passes through the respective stream are determinative of the amount of the flowable substance that is deposited onto any zone of the major surface 21 of the workpiece 20 at the affected region 22, and thus the fluorocarbon loading and/or depth of penetration of the fluorocarbon substance into the subsurface areas of the workpiece 20 and thus the vertical dimension of the affected region 22. Thus, while this region 22 has been shown to extend only to a small distance below the major surface 21, it is to be understood that enough of the flowable substance could be deposited for the affected region 22 to extend through the entire thickness of the workpiece 20.

In the above scenario, the applicator assemblies 31 and 31' can be operated in such a fashion that the applicator elements 39 and 39' issue their respective streams continuously throughout the dispensation operation, that is, whether or not there is a workpiece 20 in the paths of such streams at a particular time. However, it is also contemplated in this situation to use the valves 40 and 40' to intermittently allow and stop the flow of the flowable substance therethrough such that the above streams will be in existence only from shortly before the leading edge of the workpiece 20 enters the respective stream path to shortly after the trailing edge of the workpiece 20 leaves such path. Alternatively, the streams could be permitted to run constantly, but they could be diverted during the times that no workpiece 20 is situated in their paths. In either event, provisions are made for capturing and recirculating the flowable substance that, for one reason or another, does not reach, or remain on, the respective workpiece 20. It is to be noted that the marginal portion 23 of the workpiece 20 extends in a cantilevered manner beyond the workpiece support 12 so that any of the flowable substance that reaches the lower major surface of the workpiece 20 underneath the region 22 will not come into contact with the workpiece support 12.

The workpiece advancement speed, which is kept substantially constant, is so coordinated with the cross-sectional areas of the internal passages of the applicator elements 39 and 39' and with the pressure heads mentioned above as to achieve the desired loading of fluorocarbon and/or the desired subsurface impregnation depth. A large-size internal passage and slow advancement speed give high loadings, and vice-versa. As mentioned before, it was established that applicator elements, such as 39', having small internal passage diameters yield better dimensional control than those, such as 39, with larger internal passage diameters. Therefore, it is typically to use both of the applicator elements 39 and 39' as mentioned before, with the applicator element 39 providing for a heavy loading, and with the applicator element 39' directing its stream at the affected region perimeter where improved dimensional control is desired. Upon deposit, the fluorocarbon dispersion quickly and uniformly wicks into the interior of the substrate or workpiece 20.

Of course, when it is desired to operate the applicator assemblies 31 and 31' in the intermittent fashion that has been discussed above, for instance to minimize the amount of the flowable substance that has to be recirculated, it is necessary to determine the position of the workpiece 20 as it advances on the workpiece support 12 and to supply this information to the controller 50 to enable the latter to activate or inactivate, that is to open or close, the valves 40 or 40' at the proper times. This determination is even more important when it is desired for the affected region 22 to commence at a certain distance from the leading edge, or terminate at a certain spacing from the trailing edge, of the workpiece 20, or both.

One approach to making this determination is also illustrated in the sole Figure of the drawing, but it is to be understood that the depicted approach is illustrative only and may be modified in a variety of ways while still achieving the same purpose or results. As shown there, a detector device 60 is mounted on the main support 11. The detector device 60 includes a roller 61 that is rotatably mounted on a yoke 62 by means of two stub shafts 63 and 64. The yoke 62, in turn, is secured to an actuator member 65 which is mounted on the main support 11 for movement in opposite vertical directions and projects into an electrical switch 66. In use, the elements 61 to 65 are in their non-illustrated lower positions until reached by the leading edge of the workpiece 20 as the latter advances on or with the workpiece support 12 relative to the main support 11, upon which the further advancement of the workpiece 20 causes the lifting of the elements 61 to 65 toward and into their illustrated raised position, with attendant switching of the electrical switch 66 from one of its conductive and non-conductive stages and consequent generation of an electrical signal that is supplied through an electrical line 67 to the controller 50, apprising the latter of the arrival of the leading edge at a predetermined location. On the other hand, when the trailing edge of the workpiece 20 advances past such predetermined location, the elements 61 to 65 return to their initial positions and the switch 66 is switched into the other of its states.

The controller 50 is so constructed, in any well-known manner, as to be operative for issuing into the lines 51 and 51' the valve activating control signals only after the leading edge of the workpiece 20 has moved the desired distance beyond the location at which its arrival has been detected by the detection device 60, and the valve inactivating control signals only after the workpiece has moved an additional distance beyond this position. One way of determining such advancement distances is to supply to the controller 50, as illustrated through a line 17, a signal indicative of the advancement speed conferred by the drive 13 on the workpiece 20. In the alternative, or in addition, the angular speed of the stub shaft 64, and thus of the roller 61 which is in rolling contact with the major surface 21 of the workpiece 20 between the time of first contact thereof with the leading edge and the time of its final contact with the trailing edge of the workpiece 20, is detected by an angular speed detection device 70, and this information is supplied through a connecting line 71 to the controller 50 for calculation of the advancement distance therefrom. Of course, the movement of the elements 61 to 65 toward their lower positions, and the resulting change in the value of the signal appearing on the line 67, could be used for terminating the flowable substance flow instead.

It will be appreciated that the use of the expedients described above results in a more uniform fluorocarbon application than before. Dimensional control is also improved. The approach revealed here is also more amenable to continuous high speed production techniques and can readily be automated to run without operator assistance. While it is true that the apparatus 10 described above does not have the ability to create as complex a pattern as can be created with screen process printing, a pattern of wetproof and non-wetproof areas can nevertheless be made by defining the locations of fluorocarbon delivery or applicator elements 39 and 39' over the workpiece or electrode support or conveyor 12. In addition, the respective stream may be interrupted or made discontinuous by the valve 40 or 40' or by diversion while the workpiece 20 is passing under the tubular applicator element 39 or 39' in order to create non-wetproof areas.

Typically, it was possible to produce wetproofed areas on porous carbon substrate having fluorocarbon loadings of from 0.15 to 0.3 grams per cubic centimeter of electrode substrate. The loading was normally held within ±3% of set value with this method. Dimensional control of wetproofed areas was held to ±0.050". All in all, this method produces substantially uniform impregnation of fluorocarbon dispersions in accurately dimensionally defined areas of the electrode or a similar porous workpiece 20.

While the present invention has been illustrated and described as embodied in a particular construction of an apparatus for applying fluorocarbon dispersions to fuel cell electrodes, it will be appreciated that the present invention is not limited to this particular example; rather, the scope of protection of the present invention is to be determined solely from the attached claims.

We claim:

1. A method of applying a flowable substance to at least one area extending over less than all of a major surface of a plate-shaped fuel cell component, comprising the steps of supporting the component in such a manner that the major surface thereof extends along a plane and faces in one direction;

effecting such relative movement along the aforementioned plane between the component and a zone situated in the plane that at least the entire one area of the major surface gradually advances through the zone in an advancement direction and path; and controlledly directing at least one stream of the flowable substance substantially opposite to the one direction toward the zone in such a manner that the stream is in existence only while the zone is completely within the one area, and until the zone has coincided with all of the one area, including controlledly directing the one stream against a main portion of the zone, and controlledly directing at least one auxiliary stream of the flowable substance against another portion of the zone that is contiguous to the main portion, the one and auxiliary streams being in existence only for so long as the main and other portions of the zone, respectively, are juxtaposed with a main and border portion of the one area of the major surface, the auxiliary stream being relatively fine with respect to the one stream to give an accurate contour to the one area, and the one stream exhibiting a volumetric flow rate that is relatively high with respect to that of the auxiliary stream to rapidly deposit the flowable substance within the contour.

* * * * *